Patented Nov. 11, 1947

2,430,846

UNITED STATES PATENT OFFICE 2,430,846

PROTECTIVE COATINGS FOR METALS

John D. Morgan, South Orange, N. J., assignor to Cities Service Oil Company, New York, N. Y., a corporation of Pennsylvania No Drawing. Application March 16, 1944, Serial No. 526,814

3 Claims. (Cl. 106—14)

The present invention relates to improvements in protective coatings for metals sometimes called "slushing compounds," and the protection of metals against corrosion and atmospheric weathering. More particularly, the invention relates to improved coatings for metals which include a novel combination of wax, soap and anti-rust inhibitor which is preferably applied to the metal to be protected by spraying on while hot.

Certain soaps, such as soda and lime soaps, have been used in mineral oils as coating compounds. Paraffin wax and petrolatum have been used in other mixtures with mineral oils for metal coatings. Oil soluble corrosion inhibitors such as sodium dichromate and certain other inorganic inhibitors have been used in slushes to prevent "underfilm" corrosion. Where soaps have been used in the past in so-called protective grease coatings, it has been necessary as far as known to apply them by hand to the metal to be coated. The heavier greases must be applied by hand.

According to the present invention, the improved protective coating for metals comprises a wax as a base stock of which the coating is largely composed, from 3% to about 15% of one or more metallic soaps which are preferably water-resistant, and a special type of anti-rust inhibitor preferably made up of two separate organic compounds. The invention may be illustrated by reference to the following example of a preferred coating in which the percentages given are in percent by weight.

*Example*

| | Per cent |
|---|---|
| Paraffin wax (melting point 124° to 126° F.) | 87 |
| Lithium stearate | 10 |
| Aluminum stearate | 2 |
| Anti-rust inhibitor | 1 |

The anti-rust inhibitor is preferably a mixture of about equal parts of an amine such as dodecyl amine and isoamyl-octyl-hydrogen orthophosphate. The metal coating composition may be prepared by heating the paraffin wax to a temperature of from 300° to 400° F., adding and thoroughly mixing therein the aluminum stearate which aids in the dispersion of the lithium stearate which is later added, preferably in small proportions at a time. Finally, the inhibitor is added to the mixture and thoroughly incorporated. The preferred temperature is about 400° F. which is a suitable temperature to have the composition for spraying on metal parts to be protected. The composition of this example had a melting point of about 295° F. and is used without thinning with mineral oils or other thinning agents. The coating composition is advantageously made up as it is to be used since it is sprayed onto the metal to be protected at approximately the temperature employed in making up the composition. This provides a fresh thoroughly active compound which gives very excellent protection. However, the compound may be packed and shipped and reheated for spraying with no adverse effects or changes in the composition.

The proportions of ingredients used in the foregoing example may be varied to some extent, as for example, the lithium stearate or other lithium soap may vary from about 3% to about 12% and the aluminum stearate may vary from about 0.5% to about 3%. The proportion of inhibitor mixture will depend upon the organic compounds used, but may vary from 0.5% to about 2%.

While paraffin waxes of various melting points are preferred for the base stock of the improved metal coating, other waxes either animal, vegetable, or mineral, may be used alone or along with paraffin wax. Melting points of the wax or waxes used may vary from approximately 50° F. up to 450° F. Examples of waxes other than paraffin wax are: carnauba, beeswax, Chinese wax, Japan vegetable wax, myrtle wax, ozokerite, spermaceti wax. The coating composition is preferably made with a lithium soap, which has been found to be highly water-resistant and effective against atmospheric corrosion. However, other metal soaps may be used such as lead, barium and aluminum, and they may be salts of stearic, oleic, palmitic and wax acids. These soaps have substantial water-resistant characteristics and give very good protection against outdoor weathering conditions. For some purposes sodium and calcium soaps of the above-mentioned acids may be used, but are the least desirable of the soaps referred to. The preferred composition contains either a lithium soap of one of the above-mentioned acids, or both a lithium soap and an aluminum soap. The lithium soap makes a very flexible resistant coating and has the effect of changing the wax base stocks so that they lose their crystalline structure. Some of the other soaps such as lead, barium and aluminum soaps, also had this effect to a substantial degree.

According to the present invention, the anti-rust inhibitor is preferably a mixture of a rather high molecular weight amine and an organic ester of an acid phosphate, or a mixture of such an amine with wax acids. The wax acids or wax acid, is usually a mixture of organic acids made by the controlled oxidation of paraffin wax. The preferred wax acids have a neutralization number of 29 to 31.5. The preferred anti-rust inhibitors comprise about equal parts of isoamyl-octyl-hydrogen phosphate and an amine such as dodecyl amine, tetradecyl amine, hexadecyl amine or approximately equal parts of wax acids and dicyclohexyl amine. The anti-rust action of the inhibitor mixture is not fully understood, but it is possible that a part of the amine in the mixture reacts with a part of the acid or acids.

The improved coating composition or slushing compound of the present invention may be used for coating various parts of machinery such as gears, cylinders, etc. or may be used for coating, bearings, replacement parts, and metals to be rolled, cut or drawn. The compounds of the present invention are stable, are not oxidized by the air to become gummy and generate acids which would corrode the metals to be protected. From the foregoing description of the invention, it will be apparent that certain modifications may be made and that the compositions have many advantages which are not enumerated.

Having described the invention in its preferred form what is claimed as new is:

1. A protective coating composition for coating metal surfaces, comprising a base stock consisting essentially of a wax, from about 3% to about 15% by weight of lithium soap and a metal soap selected from the group consisting of soaps of lead, barium and aluminum, to cause the wax to lose its crystalline structure, and about 0.5 to about 2% by weight of an anti-rust agent selected from the group of mixtures consisting of dodecyl amine and isoamyl-octyl-hydrogen phosphate, tetradecyl amine and isoamyl-octyl-hydrogen phosphate, and hexadecyl amine and isoamyl-octyl-hydrogen phosphate.

2. A protective coating composition for coating metal surfaces, comprising approximately 87% by weight of paraffin wax, approximately 10% by weight of lithium stearate, approximately 2% by weight of aluminum stearate, and approximately 1% by weight of an anti-rust agent selected from the group of mixtures consisting of dodecyl amine and isoamyl-octyl-hydrogen phosphate, tetradecyl amine and isoamyl-octyl-hydrogen phosphate, and hexadecyl amine and isoamyl-octyl-hydrogen phosphate.

3. A protective coating composition for coating metal surfaces, comprising from about 3% to about 12% by weight of a lithium soap, from about 0.5% to about 3% by weight of an aluminum soap, about 1% by weight of an anti-rust agent selected from the group of mixtures of dodecyl amine and isoamyl-octyl-hydrogen phosphate, tetradecyl amine and isoamyl-octyl-hydrogen phosphate and hexadecyl amine and isoamyl-octyl-hydrogen phosphate, the remainder of the composition being essentially paraffin wax.

JOHN D. MORGAN.

REFERENCES CITED

The following references are of record in the file of this patent:

UNITED STATES PATENTS

| Number | Name | Date |
| --- | --- | --- |
| 2,348,687 | Abrams | May 9, 1944 |
| 2,320,644 | Mill | June 1, 1943 |
| 2,185,046 | Voorhees | Dec. 26, 1939 |
| 2,101,922 | Stoesling | Dec. 14, 1937 |
| 2,080,299 | Benning | May 11, 1937 |
| 1,814,221 | Metcalfe | July 14, 1931 |
| 1,472,239 | Buell | Oct. 30, 1923 |
| 2,359,946 | Sudholz | Oct. 10, 1944 |
| 2,199,933 | Gay | May 7, 1940 |
| 2,010,297 | Flaxman | Aug. 6, 1935 |
| 1,821,932 | Cushman | Sept. 8, 1931 |